United States Patent
Gayman et al.

(10) Patent No.: US 9,971,685 B2
(45) Date of Patent: May 15, 2018

(54) WEAR LEVELING BASED ON A SWAPPING OPERATION BETWEEN SETS OF PHYSICAL BLOCK ADDRESSES OF A NON-VOLATILE MEMORY

(71) Applicant: INTEL CORPORATION, Santa Clara, CA (US)

(72) Inventors: Jason A. Gayman, Cameron Park, CA (US); Robert W. Faber, Bend, OR (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 15/089,133

(22) Filed: Apr. 1, 2016

(65) Prior Publication Data

US 2017/0286293 A1    Oct. 5, 2017

(51) Int. Cl.
 *G06F 12/00* (2006.01)
 *G06F 12/06* (2006.01)
 *G06F 13/00* (2006.01)

(52) U.S. Cl.
 CPC .. *G06F 12/0646* (2013.01); *G06F 2212/7211* (2013.01)

(58) Field of Classification Search
 CPC .............. G06F 12/0646; G06F 2212/7211
 See application file for complete search history.

(56) References Cited

U.S. PATENT DOCUMENTS

| | | | |
|---|---|---|---|
| 5,572,466 A * | 11/1996 | Sukegawa | G06F 3/0601 365/185.11 |
| 7,552,272 B2 | 6/2009 | Gonzalez et al. | |
| 8,103,820 B2 | 1/2012 | Yeh et al. | |
| 8,661,189 B2 | 2/2014 | Post et al. | |
| 9,471,451 B2 * | 10/2016 | Tressler | G11C 16/3495 |
| 2003/0005156 A1 * | 1/2003 | Miryala | G06F 15/17375 709/245 |
| 2004/0083335 A1 * | 4/2004 | Gonzalez | G06F 12/0246 711/103 |
| 2005/0066130 A1 * | 3/2005 | Rudelic | G06F 12/0646 711/117 |
| 2009/0157947 A1 | 6/2009 | Lin et al. | |
| 2009/0182936 A1 | 7/2009 | Lee | |
| 2010/0131736 A1 * | 5/2010 | Lee | G06F 12/0292 711/202 |

OTHER PUBLICATIONS

International Search Report and Written Opinion dated Jun. 15, 2017, on application No. PCT/US2017/020533.

* cited by examiner

*Primary Examiner* — Mark A Giardino, Jr.

(74) *Attorney, Agent, or Firm* — Lowenstein Sandler LLP

(57) ABSTRACT

A first set representing a first plurality of physical block addresses of a non-volatile memory and a second set representing a second plurality of physical block addresses of the non-volatile memory may be identified. In response to a request to perform a wear leveling operation, first data from a first physical block address of the first set may be swapped with second data from a first physical block address of the second set. A second physical block address of the first set that is adjacent to the first physical block address of the first set may be identified. Third data from the second physical block address of the first set may be swapped with fourth data from a second physical block address of the second set that is adjacent to the first physical block of the second set.

27 Claims, 12 Drawing Sheets

WEAR LEVELING BASED ON A SWAPPING OPERATION BETWEEN SETS OF PHYSICAL BLOCK ADDRESSES OF A NON-VOLATILE MEMORY

TECHNICAL FIELD

Embodiments described herein generally relate to wear leveling, and more specifically, relate to wear leveling based on a swapping operation between sets of physical block addresses of a non-volatile memory.

BACKGROUND

Wear leveling may be performed on non-volatile memory to improve the durability of the non-volatile memory and to prolong the service time of the non-volatile memory. For example, the non-volatile memory may store data in multiple blocks. Each of the blocks may tolerate a certain number of program cycles when storing data from the write operations to the block before the data storage capability of the block becomes unreliable.

If a particular block of the non-volatile memory frequently receives write operations to store data at the block while other blocks of the non-volatile memory do not receive such frequent write operations, then data storage capability of the block may become unreliable more quickly than the data storage capabilities of the other blocks of the non-volatile memory. Wear leveling may be performed to move the data of the block to another block associated with fewer write operations so that subsequent write operations may perform subsequent program cycles to the other block with fewer write operations.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
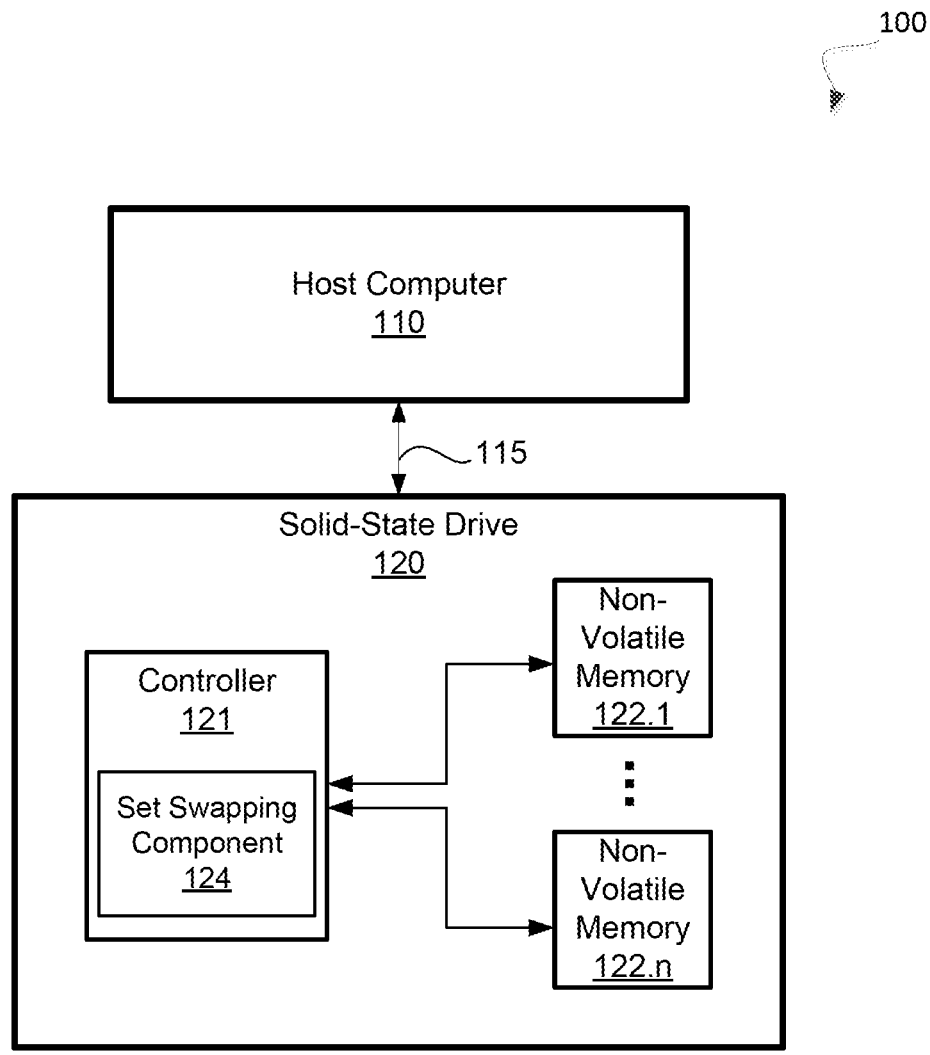
FIG. 1 illustrates an embodiment of a computing environment including an example solid-state drive in accordance with some embodiments of the present disclosure.

Aspects of the present disclosure are directed to wear leveling based on a swapping operation between sets of physical block addresses of a non-volatile memory. In general, a non-volatile memory may include physical block addresses, also referred to as locations, which are divided or distributed between a first set of physical block addresses and a second set of physical block addresses. The first set of physical block addresses and second set of physical block addresses may correspond to sets of physical block addresses of an address space of the non-volatile memory that receive a different workload or write operation distribution from a host computer or application. For example, the first set of physical block addresses may be expected to store data from a higher number or rate of write operations than the second set of physical block addresses. In some embodiments, the first set of physical block addresses may be used as a cache memory for the second set of physical block addresses that may be used as storage for user data.

A controller of a Solid State Drive (SSD) may include functionality to provide a wear leveling operation for the non-volatile memory in the SSD. For example, a wear leveling operation may use a mathematical transform or lookup to map a logical address to a physical block address of the non-volatile memory in the SSD. Write operations to a particular logical address may result in the writing of data to the physical block address that is mapped to the particular logical address of the non-volatile memory (e.g., via a pointer). When the particular physical block address of the non-volatile memory receives a higher rate or number of write operations to store data at the physical block address by using the corresponding logical address, the mathematical transform or lookup may change the pointer of the logical address to another physical block address in the address space of the non-volatile memory. Thus, subsequent write operations to the logical address that is associated with a higher number of write operations may store data at a different physical block address of the non-volatile memory that has received a lesser number of write operations.

The use of the mathematical transform or a lookup may be used with a lookup table. Since many logical addresses of the non-volatile memory may be remapped to different physical block addresses based on the mathematical transform or lookup, the lookup table for the non-volatile memory may be large and take a larger amount of storage capacity as well as incur a higher latency when determining whether a logical address has been remapped to a different physical block address and to which physical block address the logical address may have been remapped to. For example, when a read operation is received, the lookup table may be used to determine which of the physical block addresses the logical address of the read operation points to.

Aspects of the present disclosure may address the above and other deficiencies by using a swapping operation between the first and second sets of physical block addresses of the address space of the non-volatile memory that is associated with a lower latency. The first set may represent a first set of logical addresses that are mapped or are pointing to a first set of physical block addresses of the non-volatile memory and the second set may represent a second set of logical addresses that are mapped or are pointing to a second set of physical block addresses of the non-volatile memory. At an initial state, the first physical block address of the second set may be adjacent to the last physical block address of the first set. Data stored at a first physical block address of the first set may be swapped with data stored at a first physical block address of the second set. After the swapping of the data between the physical block addresses of the first and second sets, the first physical block address of the first set may be removed from the first set and added to the second set and the first physical block address of the second set may be removed from the second set and added to the first set.

As an example, initially, the first set may include a first logical address through a tenth logical address that are each respectively mapped or pointing to a first physical block address through a tenth physical block address of an non-volatile memory. Thus, the first through tenth physical block addresses may be included as part of the first set. The second set may initially include logical addresses eleven through fifty that are respectively mapped or pointing to physical block addresses eleven through fifty of the non-volatile memory. Thus, the eleventh through fiftieth physical block addresses may be included as part of the second set. A first swapping operation between the first set and the second set may swap data stored at the physical block address that is pointed to by the first logical address of the first set with data stored at the physical block address that is pointed to by the first logical address of the second set (e.g., logical address eleven pointing to physical block address eleven).

The swapping operation between the first set and the second set may continue until data in each of the physical block addresses that are pointed to by logical block addresses that are in the first set are swapped once. The swapping operation may incrementally continue for each subsequent physical block address of the first set. For example, after swapping data of the first physical block address of the first set, at a second time the first physical block address of the first set may be incremented and the data of the second physical block address (e.g., the incremented physical block address) of the first set may be swapped with data of the physical block address of the second set that is adjacent to the physical block address of the first set that was previously swapped (e.g., adjacent to the last physical block address that was associated with a swap and added to the first set). For example, the data associated with the second physical block address of the first set may be swapped with data of the twelfth physical block address which may be adjacent to the eleventh physical block address that was previously swapped with and assigned to the first set. The swapping operation and the removing and adding of the physical block addresses between the first and second sets may continue until data of each physical block address of the first set has been swapped once. Thus, the first set may first include a first group of physical block addresses (e.g., first through fifth physical block addresses) and after a cycle to move each data of the first set to new physical block addresses, the first set may subsequently include a second group of physical block addresses (e.g., sixth through tenth physical block addresses) while the first group are removed from the first set and added to the second set during the cycle.

Thus, the first set that may correspond to physical block addresses that are pointed to by the logical addresses that are to receive a higher number of write operations may move or migrate through the physical block addresses of the non-volatile memory by swapping or moving data from one physical block address to another physical block address in an order where, for each cycle, the data of a physical block address corresponding to a logical address that has not yet been swapped is copied to a physical block address corresponding to a physical block address that is adjacent to the physical block address of the first set that was last swapped.

FIG. 1 illustrates an example computing environment 100 including a solid-state drive 120. In general, the computing environment 100 may include a host computer 110 that includes or is coupled to a solid-state drive 120. The host computer 110 may be a type of computing system or computing device that is operatively coupled to the solid-state drive 120. For example, an input/output (I/O) interface 115 may be used to transfer data between the host computer 110 and the solid-state drive 120. The I/O interface 115 may be arranged as a Serial Advanced Technology Attachment (SATA) interface to couple elements of the host computer 110 to the solid-state drive 120. In the same or alternative embodiments, the I/O interface 115 may be arranged as a Serial Attached SCSI (SAS) interface to couple the elements of the host computer 110 to the solid-state drive 120. In some embodiments, the I/O interface 115 may be arranged as a Peripheral Component Interconnect Express (PCIe) interface or a Non-Volatile Memory (NVM) Express interface to couple the elements of the host computer 110 with the solid-state drive 120. Further details with regard to the host computer 110 are described in conjunction with FIGS. 6-7.

As shown in FIG. 1, the solid-state drive 120 may include a controller 121 (also referred to as an SSD controller) and non-volatile memory 122.1 to 122.n. In some embodiments, non-volatile memory may refer to one of the non-volatile memory packages (e.g., chips or dies) and in other embodiments non-volatile memory may refer to multiple non-volatile memory packages. The controller 121 may manage data stored at the non-volatile memory 122.1 to 122.n and may communicate with the host computer 110 via the I/O interface 115. For example, the controller 121 may receive write operations from the host computer 110 via the I/O interface 115 to store data at the non-volatile memory 122.1 to 122.n and read operations from the host computer 110 to retrieve data from the non-volatile memory 122.1 to 122.n. The controller 121 may further control other such operations for the non-volatile memory 122.1 to 122.n or other components of the solid-state drive 120 such as wear leveling operations or translations between logical and physical addresses. Further details with regard to the solid-state drive 120 are described in conjunction with FIG. 6.

. The non-volatile memory 122.1 to 122.n may include one or more chips or dies that may individually include one or more types of non-volatile memory devices. The non-volatile memory may be embodied as any type of data storage capable of storing data in a persistent manner (even if power is interrupted to non-volatile memory). In some embodiments, the non-volatile memory devices of the non-volatile memory may be embodied as planar or three-dimensional NAND ("3D NAND") non-volatile memory devices or NOR. However, in other embodiments, the non-volatile memory may be embodied as any combination of memory devices that use chalcogenide phase change material (e.g., chalcogenide glass), three-dimensional (3D) crosspoint memory, or other types of byte-addressable, write-in-place non-volatile memory, ferroelectric transistor random-access memory (FeTRAM), nanowire-based non-volatile memory, phase change memory (PCM), memory that incorporates memristor technology, Magnetoresistive random-access memory (MRAM), Spin Transfer Torque (STT)-MRAM, silicon-oxide-nitride-oxide-silicon (SONOS) memory, polymer memory such as ferroelectric polymer memory, ovonic memory, nanowire or electrically erasable programmable read-only memory (EEPROM), etc. As previously described, the solid-state drive 120 may include a non-volatile memory. However, examples described in the present disclosure are not limited to solid-state drives that include non-volatile memory. For example, computing devices (e.g., a tablet or a mobile communications device such as a smartphone) that include a non-volatile memory may be contemplated. Furthermore, other types of storage devices, such as hard disk drives (HDDs) may be contemplated. In some embodiments, the non-volatile memory 122.1 to 122.n may correspond to a two level memory (2LM) where a first portion of the memory corresponding to a first set of addresses may be used as a cache for a second portion of the memory corresponding to a second set of addresses. For example, the 2LM may correspond to a solid-state drive that includes both a memory region and a storage region. The memory region may correspond to the first set of addresses that are expected to receive a higher frequency of write operations than the storage region which may correspond to the second set of addresses that are expected to receive a lower frequency of write operations.

Furthermore, the controller 121 may include a set swapping component 124 that performs a wear leveling operation for the solid-state drive 120 based on the swapping of data associated with the non-volatile memory 122.1 to 122.n. Further details with regard to the set swapping component 124 are described in conjunction with FIGS. 2-5.

Figure 2:
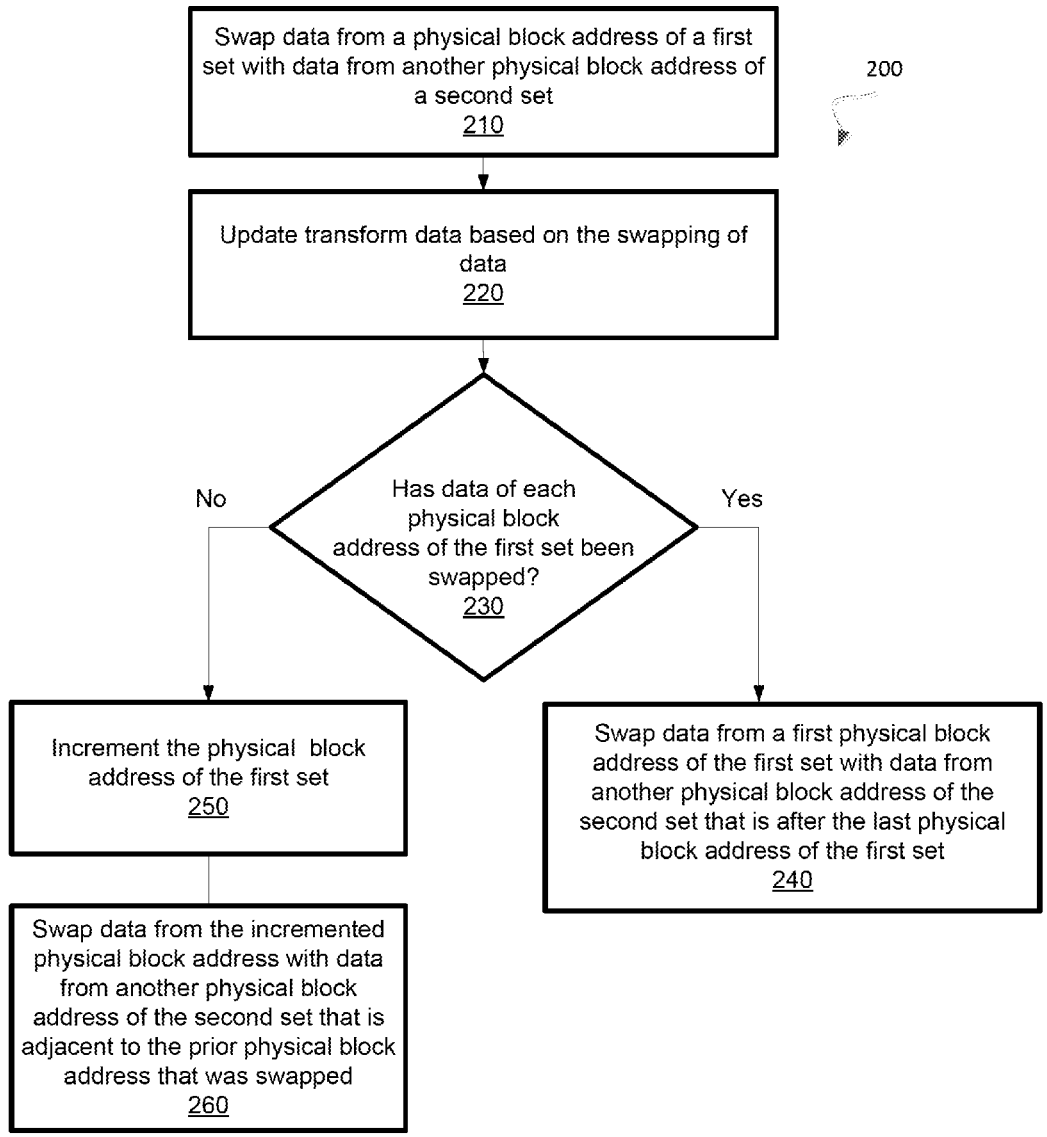
FIG. 2 is a flow diagram of an example method to swap data between physical block addresses of sets of a solid-state drive in accordance with some embodiments.

FIG. 2 is a flow diagram of an example method 200 to swap data stored in the non-volatile memory between physical block addresses of sets of the non-volatile memory. In general, the method 200 may be performed by processing logic that may include hardware (e.g., circuitry, dedicated logic, programmable logic, microcode, etc.), software, firmware, or a combination thereof. In some embodiments, the set swapping component 124 of FIG. 1 may perform a portion of or all of the operations of the method 200.

As shown in FIG. 2, the method 200 may begin with the processing logic swapping data stored in the memory from a physical block address of a first set of data stored in memory with data from another physical block address of a second set (block 210). For example, data from a first physical block address of the first set may be moved to a physical block address of the second set and data from the physical block address of the second set may be moved or copied to the first physical block address of the first set. In some embodiments, a buffer memory is used to store the data that is to be swapped. For example, data from the first physical block address of the first set and the data from the physical block address of the second set may be copied to the buffer memory before the swapping of the data. The physical block address of the second set may be a physical block address that is adjacent to the last or final physical block address of the first set. In some embodiments, the data may be swapped from the physical block address associated with the first logical address of the first set with the data from the physical block address associated with the first logical address of the second set (e.g., the physical block address of the second set that is adjacent to the physical block address pointed to by the last logical address of the first set). The processing logic may further update transform data based on the swapping of the location of the data (block 220). For example, a start value for a span of the first set and an offset for a span of the second set may be updated as further described in conjunction with FIGS. 5A and 5B. As a result of the updating of the transform data, the first physical address block may be considered to be part of the second set as a logical address of the second set points to the first physical address. Furthermore, the other physical block address that was previously part of the second set may be considered to be part of the first set as the first logical address of the first set may now point to the other physical block address.

Referring to FIG. 2, the processing logic may determine whether data from each physical block address of the first set has been swapped (block 230). For example, a determination may be made as to whether data in each physical block address that is pointed to by a logical address of the first set has been swapped one time. If the data in each physical block address associated with the first set has been swapped once with data in physical block addresses associated with the second set, then the processing logic may swap data from the first physical block address of the first set with data from another physical block address of the second set that is after or adjacent to the last physical block address of the first set (block 240). However, if the data in each physical block address of the first set has not been swapped one time, then the processing logic may increment the physical block address of the first set (block 250). For example, the physical block address of the first set that was associated with the prior swap may be incremented to determine an incremented physical block address. Furthermore, the processing logic may swap data from the incremented physical block address with data from another physical block address of the second set that is adjacent to the prior physical block address of the second that associated with the prior swap. For example, the data from the incremented physical block address of the first set may be swapped with data from another physical block address of the second set that is adjacent to the last physical block address that was added to the first set and removed from the second set.

As such, a first physical block address of a first set may be associated with a swap of data with first other physical block address. The first physical block address may be incremented and data from the incremented physical block address may be associated with a swap of data with a second other physical block address that is adjacent or next to the first other physical block address.

Figure 3A:
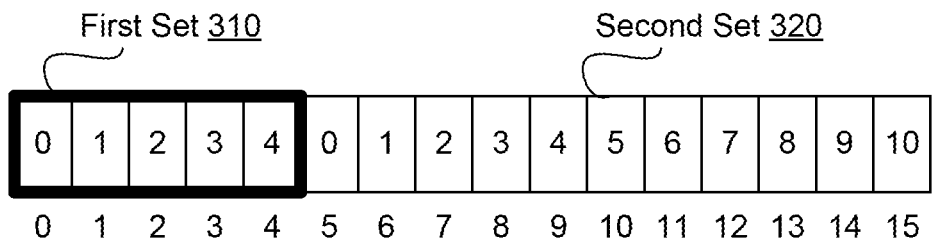
FIG. 3A illustrates an example of a first set and a second set of physical block addresses in accordance with some embodiments of the present disclosure.

FIG. 3A illustrates an example of a first set 310 and a second set 320 of physical block addresses. In general, the first set 310 and the second set 320 may correspond to sets of physical block addresses in an address space of the solid-state drive 120 of FIG. 1 at a first time. As shown in FIG. 3A, the solid-state drive may be associated with a first set 310 of physical block addresses that are mapped to a first group of logical addresses. For example, the first set 310 may include a logical address of 0, 1, 2, 3, and 4 that respectively mapped to physical block addresses of 0, 1, 2, 3, and 4. Furthermore, the second set 320 may include another group of logical addresses 0 through 10 that are mapped to physical block addresses 5 through 15. The first set 310 and the second set 320 may be considered to be logically contiguous so that the logical addresses are mapped to physical block addresses in an increasing order through the logical address space of the solid-state drive 120.

Figure 3B:
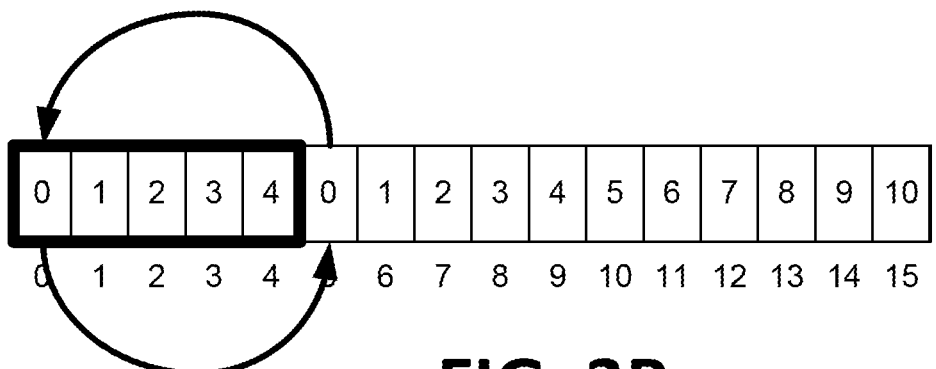
FIG. 3B illustrates an example of a swapping operation between physical block addresses in accordance with some embodiments of the present disclosure.
Figure 3C:
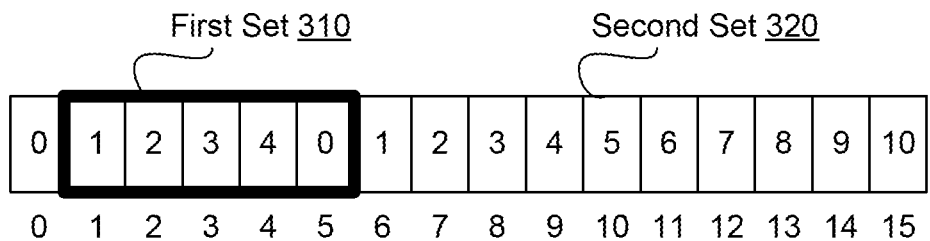
FIG. 3C illustrates an example of the first set and the second set after a swap between physical block addresses in accordance with some embodiments of the present disclosure.

FIG. 3B illustrates an example of a swapping operation between physical block addresses. In general, FIG. 3B may represent the swapping operation relative to the first set 310 and the second set 320 of FIG. 3A at a second time. For example, the swapping operation may move data from the first physical block address of 0 that is included in the first set to the sixth physical block address of 5 that is currently in the second set. A physical block may correspond to a portion of the non-volatile memory. For example, each physical block may be a particular size of a portion of the non-volatile memory. The size of the physical block may be, but is not limited to, 4 kilobytes or 512 bytes. FIG. 3C illustrates an example of the first set 310 and the second set 320 after the swap between the physical block addresses as shown in FIG. 3B. As a result of the swapping operation, the first logical address 0 of the first set maps to the fifth physical block address and the first physical block address of 0 is now included as part of the second set 320 as the logical address 0 of the second set maps to the first physical block address of 0.

Figure 3D:
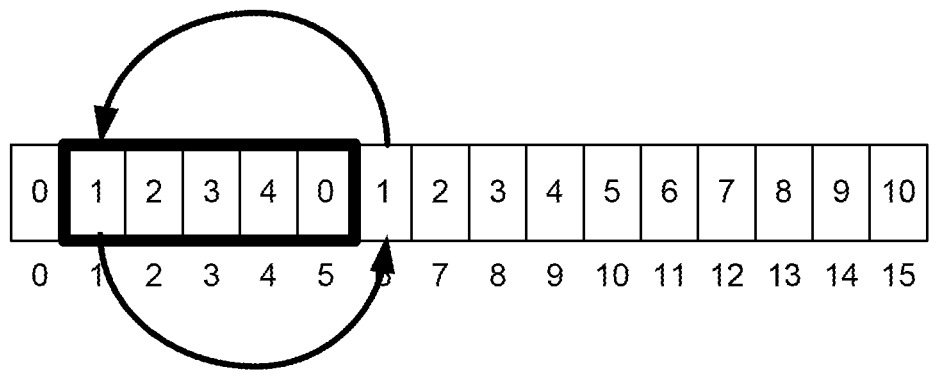
FIG. 3D illustrates an example of a second swapping operation between physical block addresses in accordance with some embodiments of the present disclosure.
Figure 3E:
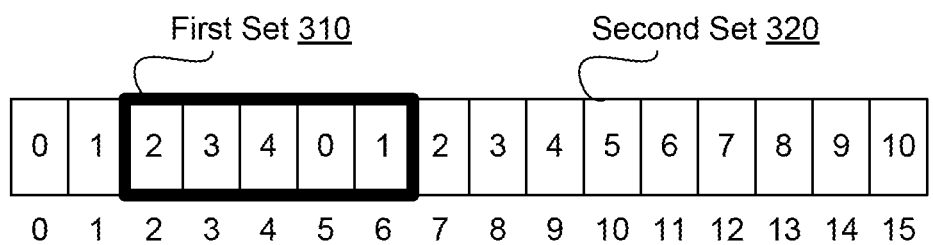
FIG. 3E illustrates an example of the first set and the second set after the second swap operation between physical block addresses in accordance with some embodiments of the present disclosure.
Figure 3F:
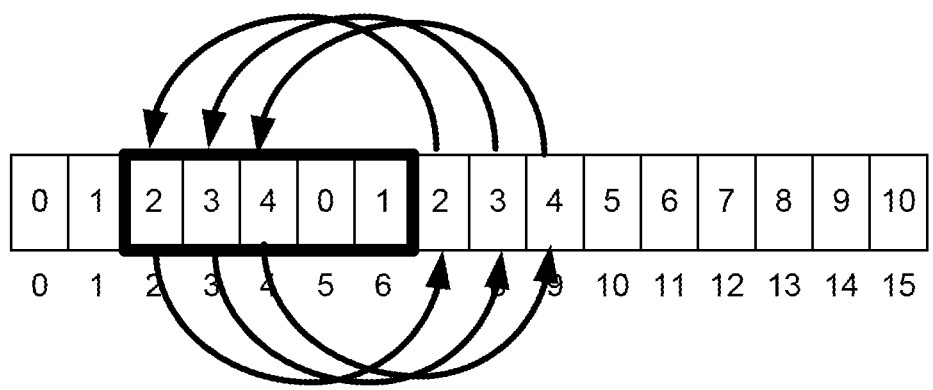
FIG. 3F illustrates an example swap operations in accordance with some embodiments of the present disclosure.

FIG. 3D illustrates an example of a second swapping operation between the physical block addresses of FIG. 3C. For example, data of the second physical block address may be swapped with data of the seventh physical block address. Thus, the data of the first set of an incremented physical block address is swapped with data of the physical block address of the second set that is after and adjacent to the last physical block address of the first set that was previously associated with the prior swapping operation. FIG. 3E illustrates the first set 310 and the second set 320 after the second swap operation between the physical block addresses. Furthermore, FIG. 3F illustrates further swap operations of data of the remaining physical block addresses mapped to by the remaining logical addresses of the first set 310 that have not yet been swapped.

Figure 3G:
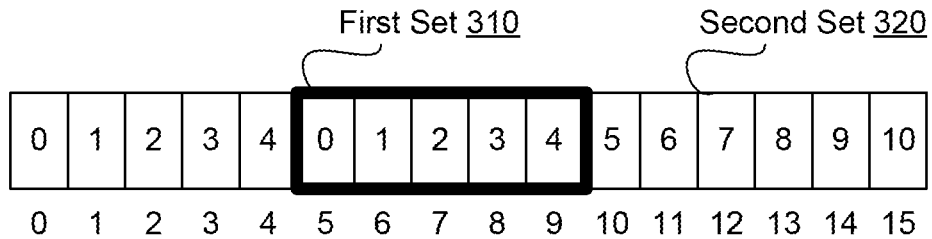
FIG. 3G illustrates an example of the first set moving a span within the second set in accordance with some embodiments of the present disclosure.

FIG. 3G illustrates the first set 310 moving a span (e.g., the number of logical addresses of the first set 310) within the second set 320 after one cycle of swapping operations that have changed the pointers of the logical addresses of the first set 310 to new physical block addresses. For example, FIG. 3G illustrates the first set and the second set after the swapping operations of FIG. 3F. As shown, the logical addresses of the first set 310 may map to the sixth through tenth physical block addresses as opposed to the first through fifth physical block addresses.

Figure 3H:
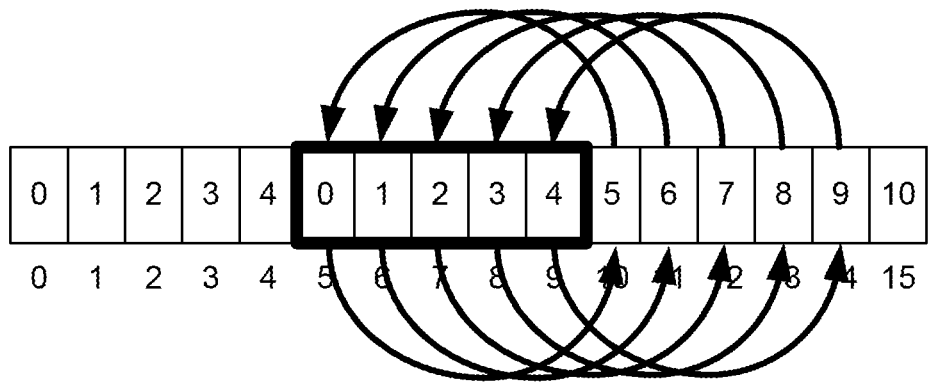
FIG. 3H illustrates an example of the first set moving another span within the second set in accordance with some embodiments of the present disclosure.
Figure 3I:
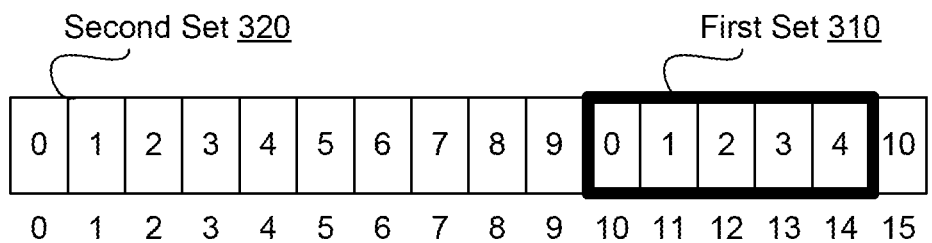
FIG. 3I illustrates an example of the first set and the second set after the first set moving multiple spans within the second set in accordance with some embodiments of the present disclosure.

FIG. 3H illustrates an example of the first set 310 moving another span within the second set 320 after the moving of the prior span as illustrated in FIG. 3G. As shown, additional swapping operations may be performed to swap data between physical block addresses and FIG. 3I illustrates the resulting moving of the first set 310 through the address space. For example, the logical addresses of the first set may not map to the eleventh through fifteenth physical block addresses.

Figure 3J:
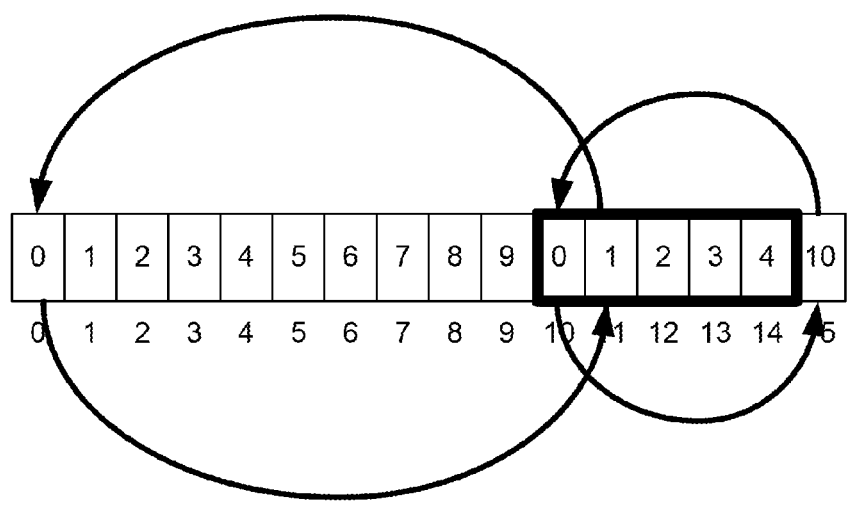
FIG. 3J illustrates an example of additional swap operations between physical block addresses of the first set and the second set that cross a boundary or edge of the second set in accordance with some embodiments of the present disclosure.
Figure 3K:
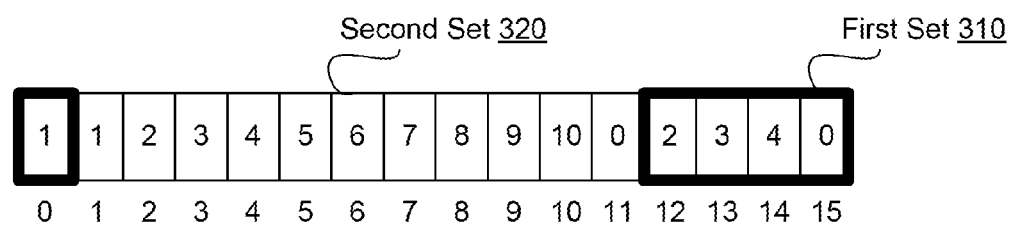
FIG. 3K illustrates an example of the first set at the beginning and end of the physical block addresses in accordance with some embodiments of the present disclosure.

FIG. 3J illustrates additional swap operations between physical block addresses of the first set 310 and the second set 320 that cross a boundary or edge of the address space (e.g., the last physical block address of the address space). For example, data from the first physical block address of the first set (e.g., the eleventh physical block address of the address space) may be swapped with the last physical block address in the address space and the incremented physical block address of the first set (e.g., the twelfth physical block address) may be swapped with the first physical address in the address space. FIG. 3K illustrates an example of the first set at the beginning and end of the physical block addresses in the address space after the swap operation of FIG. 3J.

The set swapping operation corresponding to a wear leveling may be performed based on a refresh rate associated with the non-volatile memory or based on time increments where a passing of each time increment results in one swap operation. The refresh rate may correspond to a reprogramming of a data value that is stored at a particular physical block address. For example, a solid-state drive may specify that each data value stored at physical block addresses of the non-volatile memory of the SSD is to be reprogrammed over a particular time period (e.g., a few hours or a few days). In some embodiments, the set swapping operation may be performed based on the rate that write operations are received. For example, as the rate of write operations that are received increases, then the rate at which the set swapping operation swaps data between physical block addresses may be increased. In the same or alternative embodiments, the rate at which the swaps occur may be based on a size of the first set and the second set and a time period by which the data of the first set is swapped through the non-volatile memory. For example, if the first set is at a first size and the second set is at a second size and the first set is to associated with swapping operations of each physical block address of the non-volatile memory, then the rate at which the swapping operation is performed may be so that data from the first set are swapped with each physical block address of the second set of the non-volatile memory within the time period.

Figure 4:
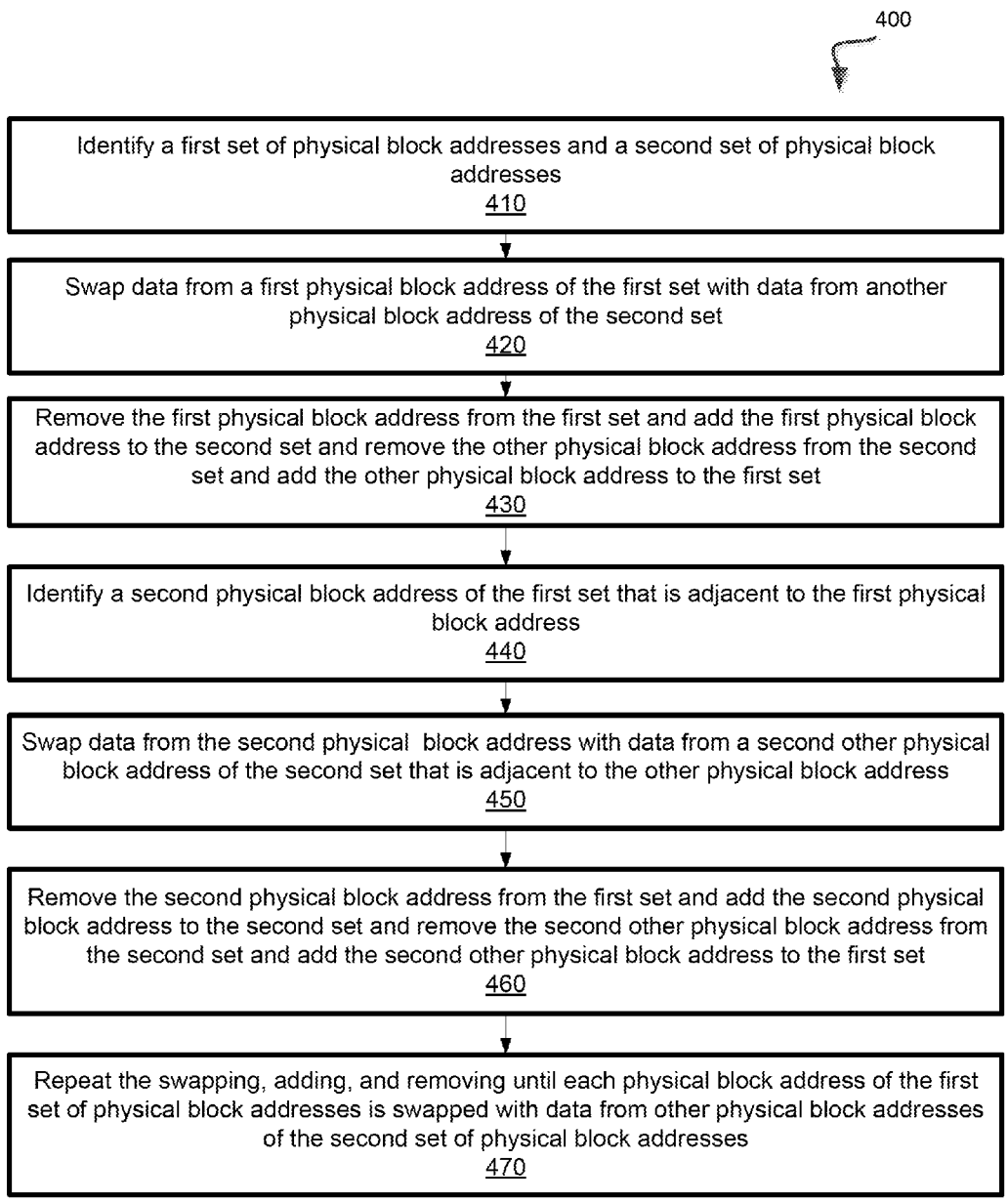
FIG. 4 is a flow diagram of an example method to swap data and to remove and add physical block addresses to the first set and the second set in accordance with some embodiments of the disclosure.

FIG. 4 is a flow diagram of an example method 400 to swap data and to remove and add physical block addresses to the first set and the second set. In general, the method 400 may be performed by processing logic that may include hardware (e.g., circuitry, dedicated logic, programmable logic, microcode, etc.), software, firmware, or a combination thereof. In some embodiments, the set swapping component 124 of FIG. 1 may perform a portion of or all of the operations of the method 400.

As shown in FIG. 4, the method 400 may begin with the processing logic identifying a first set of physical block addresses and a second set of physical block addresses (block 410). The processing logic may further swap data from a first physical block address of the first set with data from another physical block address of the second set (block 420). For example, the first physical block address may be mapped to by a first logical address of a first set and the another physical block address may be mapped to by a first logical address of the second set. The processing logic may subsequently remove the first block address from the first set and add the first physical block address to the second set and remove the other physical block address from the second set and add the other physical block address to the first set (block 430). For example, transform data may be modified or changed where the transform corresponding to the modified transform data may be used to map a logical address with a physical block address as described in conjunction with FIGS. 5A and 5B. Subsequently, the processing logic may identify a second physical block address of the first set that is adjacent to and after the first physical block address (block 440). For example, the second physical block address may be at an incremented address from the first physical block address. The processing logic may then swap data from the second physical block address with data from a second other physical block address of the second set that is adjacent to and after the other physical block address (block 450). In some embodiments, the second other physical block address may be adjacent to and after the other physical block address that is associated with the swap at block 420. Subsequently, the processing logic may remove the second physical block address from the first set and add the second physical block address to the second set and remove the second other physical block address from the second set and add the second other physical block address to the first set (block 460). For example, the transform data may be modified or changed in response to the subsequent swapping of data. Furthermore, the processing logic may repeat the swapping of data between physical block addresses and the adding and removing of the physical block addresses to and from the first and second sets until data from each physical block address of the first set of physical block addresses is swapped with data from other physical block addresses of the second set of physical block addresses (block 470).

Figure 5A:
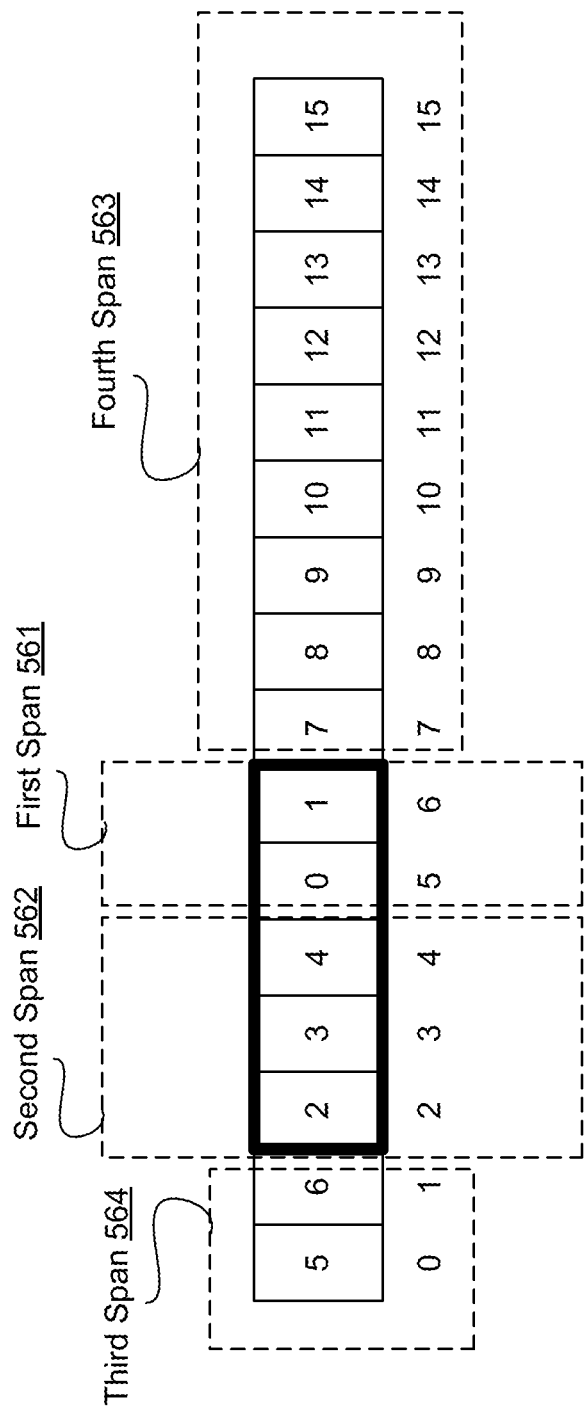
FIG. 5A illustrates a block diagram of the spans of each of the first set and the second set in accordance with some embodiments of the present disclosure.

FIG. 5A illustrates a block diagram of the spans of each of the first set and the second set. In general, a first span 561 and a second span 562 are associated with a first set and a third span 564 and a fourth span 63 are associated with a second set.

As shown, the spans of FIG. 5A may be used to map a logical address to a physical block address of a non-volatile memory in an SSD. For example, the logical addresses of the first set may be mapped or pointing to the physical block addresses in the first span 561 and the second span 562 and the logical addresses of the second set may be mapped or pointing to the physical block addresses in the third span 564 and the fourth span 563. As such, the physical block addresses of the non-volatile memory in the SSD are distributed among four spans where two spans correspond to the first set and two spans correspond to the second set. Each of the spans may be associated with a start logical address and an offset that may be used to map the logical address to a physical block address. For example, the first span 561 may be associated with a start logical address of '0' and an offset of 5 since the start logical address is mapped to the sixth physical block address. Each of the spans may thus be associated with a start logical address and an offset that is based on the physical block address that is mapped to the start logical address of the corresponding span. In response to a swap operation as previously described, the start logical address and the offset associated with one or more of the spans may be updated or changed. For example, in response to a swap between the data of the first logical address '2' of the second span 562 with the data of the seventh logical address that is included in the fourth span 563, the start logical address of the second span 562 may be updated to identify that the next logical address of '3' is the start logical address with an offset of three and the start logical address of the fourth span 563 may also be updated to identify that the eighth logical address is the start logical address with an offset of eight.

Figure 5B:
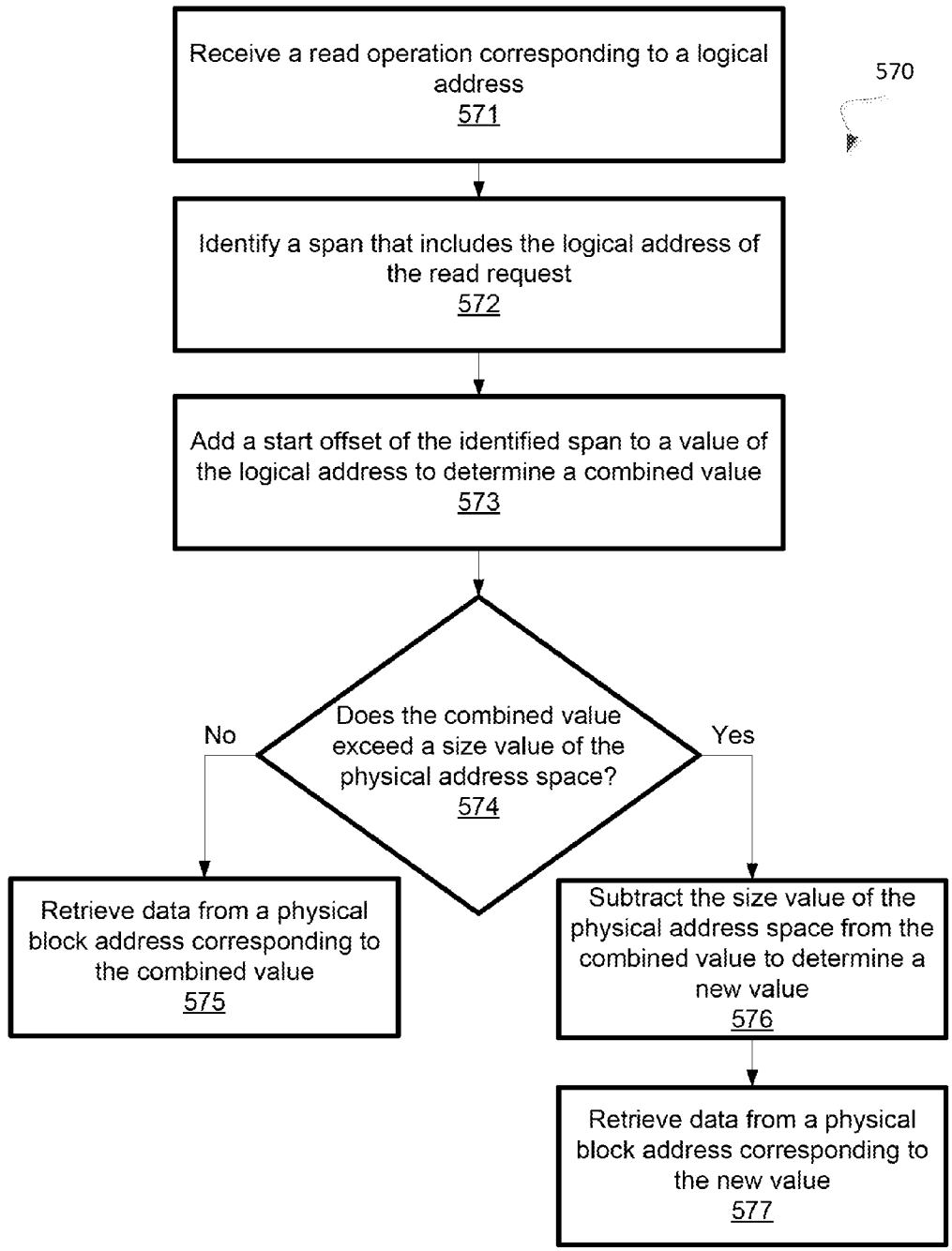
FIG. 5B is a flow diagram of an example method to use a transform to map a logical address to a physical block address in accordance with some embodiments of the present disclosure.
Figure 5C:
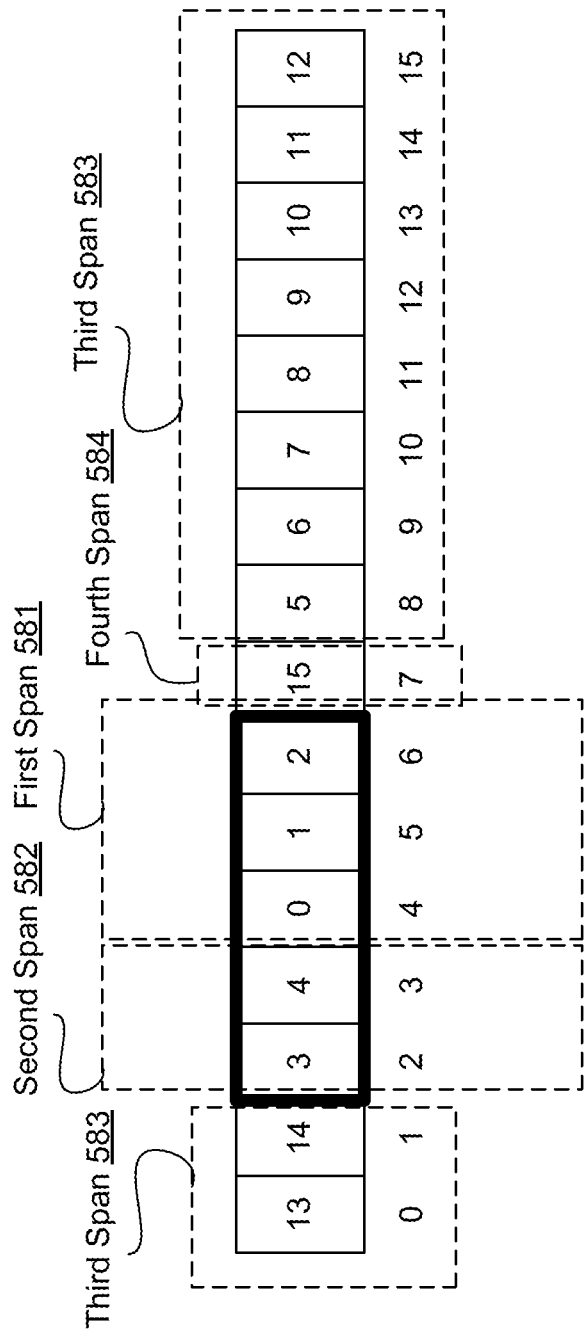
FIG. 5C illustrates a block diagram of the spans of each of the first set and the second set in accordance with some embodiments of the present disclosure.

FIG. 5B is a flow diagram of an example method 570 to use a transform to map a logical address to a physical block address. In general, the method 570 may be performed by processing logic that may include hardware (e.g., circuitry, dedicated logic, programmable logic, microcode, etc.), software, firmware, or a combination thereof. In some embodiments, the set swapping component 124 of FIG. 1 may perform a portion of or all of the operations of the method 570.

As shown in FIG. 5B, the method 570 may begin with the processing logic receiving a read operation corresponding to a logical address (block 571). For example, the read operation may request to retrieve data that is mapped to by the logical address. The processing logic may subsequently identify a span that includes the logical address of the read request (block 572). For example, transform data that specifies the start logical address of each of the spans may be compared with the logical address of the read request to identify the span that includes the logical address from the read request. The processing logic may add an offset of the identified span to a value of the logical address to determine a combined value (block 573). The offset may correspond to the physical block address to which the start logical address maps to. Thus, the combined value may be based on the offset and the start logical address of the span that includes the logical address of the read operation. The processing logic may further determine whether the combined value exceeds a size value of the physical address space (block 574). The size value of the physical address space may be the number of physical block addresses that are included in the first set and the second set. If the combined value does not exceed the size value of the physical address space, then the processing logic may retrieve the data from a physical block address corresponding to the combined value (block 575). However, if the combined value exceeds the size value of the physical address space, then the processing logic may subtract the size value of the physical address space from the value of the logical address to determine a new value (block 576). Subsequently, the processing logic may retrieve data from a physical block address corresponding to the new value (block 577).

As an example, a first set of physical block addresses may include five physical block addresses and a second set of physical block addresses may include eleven physical block addresses. A read operation for a logical address '1' may be received. A span of logical addresses that includes the logical address '1' may be identified. For example, the span may include logical addresses '0' and '1' as illustrated in FIG. 5A. An offset for the span may be the physical block address that the logical address '1' (e.g., the first logical address in the identified span) is mapped to. For example, the logical address '1' may be mapped to a physical block address '6' of the physical block address space. Thus, the combined value for the logical address of the read operation may be seven (e.g., logical address of 1 combined with the offset of 6 that corresponds to the logical start address pointing to a physical block address six addresses spaces ahead in the address space). Furthermore, the size value of the physical address space may be sixteen (e.g., five addresses of the first set combined with eleven addresses of the second set). Since the combined value of seven does not exceed the size value of sixteen, then the logical address '1' may be mapped to a physical block address '7' and data from this physical block address may be retrieved in response to the read operation. However, as shown in the spans 581, 582, 583, and 584 of FIG. 5C, if a read request for a logical address of '14' is received and the logical address of '14' at a particular time of the read request is in a range of logical addresses of a particular span that is associated with an offset of three (e.g., the start logical address of '5' pointed to physical block address '8' of the physical address space), then the combined value of seventeen would exceed the size value of the physical address space (e.g., sixteen). As such, the size value of the physical address space (e.g., sixteen) may be subtracted from the combined value of seventeen to determine a new value which may identify a physical block address of '1' for which data is retrieved for the read operation.

Furthermore, the following transform may map or point the logical address to a particular physical block address:

Physical Block Address $(L) = (L\alpha + O\beta) \mod (X+Y)$

In some embodiments, the transform may be implemented with a comparator to determine the particular span that includes the logical address of a read operation, an adder to add the values as shown above, components to perform a modulo operation, and a number of registers to store a start logical address and an offset for each of the spans and a number of addresses in the physical address space. For example, the offset $O\beta$ for a particular span may be identified in the registers where the offset indicates the physical block address to which the first logical address of the particular point is mapped to. The registers may further identify a start logical address for each of the spans that indicates a first logical block address for a corresponding span and another register indicates a start logical address of the following span. The number of addresses may correspond to the number of block addresses in the physical address space of the non-volatile memory in the SSD where X may be the number of physical block addresses associated with the first set and Y may be the number of physical block addresses associated with the second set.

Write operations to logical addresses may similarly use the transform as described above to identify a physical block address that is mapped to the logical address of the write operation. For example, a write operation may identify a logical address and data that is to be stored at a physical block address that corresponds to or is mapped to the logical address. The physical block address may be identified based on the transform that identifies the span that includes the logical address of the write operation, the start logical address of the identified span, the offset of the identified span, and the number of addresses in the physical block address space.

Figure 6:
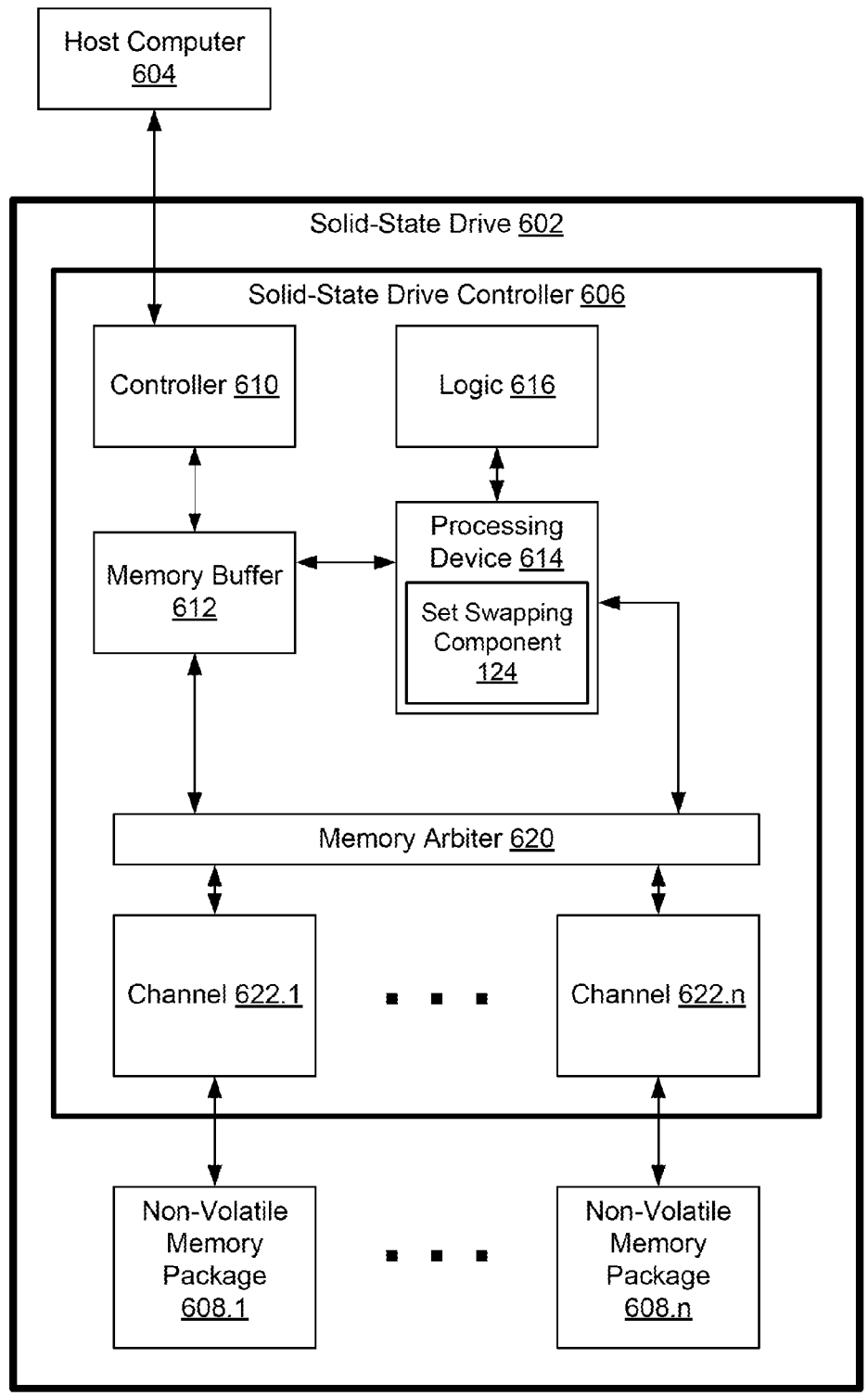
FIG. 6 is a block diagram of an example solid-state drive that is associated with a computer system.

FIG. 6 is a block diagram of an example computer system associated with a solid-state drive.

As shown in FIG. 6, the computer system includes a host computer 1604 communicably coupled to a solid-state drive 602 by an I/O interface 605 or bus (e.g., via the I/O interface 115). For example, the host computer 104 may employ the system bus 105 for transferring digital information, such as data, computer-executable instructions, applications, write operations, read operations, etc., between the host computer 604 and the solid-state drive 602. The solid-state drive 102 may include a solid-state drive controller 606 (e.g., an SSD controller) and a plurality of non-volatile memory packages 108.1-108.*n* (e.g., NAND flash packages. The solid-state drive controller 606 may include a controller 610 communicably coupled to the I/O interface 605, a memory buffer 612, a processing device 614, control logic circuitry 616, a memory arbiter 620, and a plurality of channels 622.1-622.*n* communicably coupled between the memory arbiter 620 and the non-volatile memory packages 608.1-608.*n*, respectively. Furthermore, the solid state drive controller 606 may include a set swapping component 124.

The memory buffer 612 may be implemented using a volatile static random access memory (SRAM), or any other volatile memory, for at least temporarily storing digital information (e.g., the data, computer-executable instructions, applications, etc.) as well as context information for the solid-state drive 602. Further, the processing device 614 may be configured to execute at least one program out of at least one memory to allow the memory arbiter 620 to direct the information from the memory buffer 612 to the solid-state memory within the non-volatile memory packages 608.1-608.*n* via the channels 622.1-622.*n*. Furthermore, via the I/O interface 605, the controller 610 may receive commands issued by the host computer 604 for writing or reading the data to and from the solid-state memory within the non-volatile memory packages 608.1-608.*n*.

The non-volatile memory packages 608.1-608.*n* may each include one or more non-volatile memory dies, in which each non-volatile memory die may include non-volatile memory (e.g., NAND flash memory) configured to store digital information or data in one or more arrays of memory cells organized into one or more pages. For example, the non-volatile memory package 608.1 may include one or more non-volatile memory dies.

Figure 7:
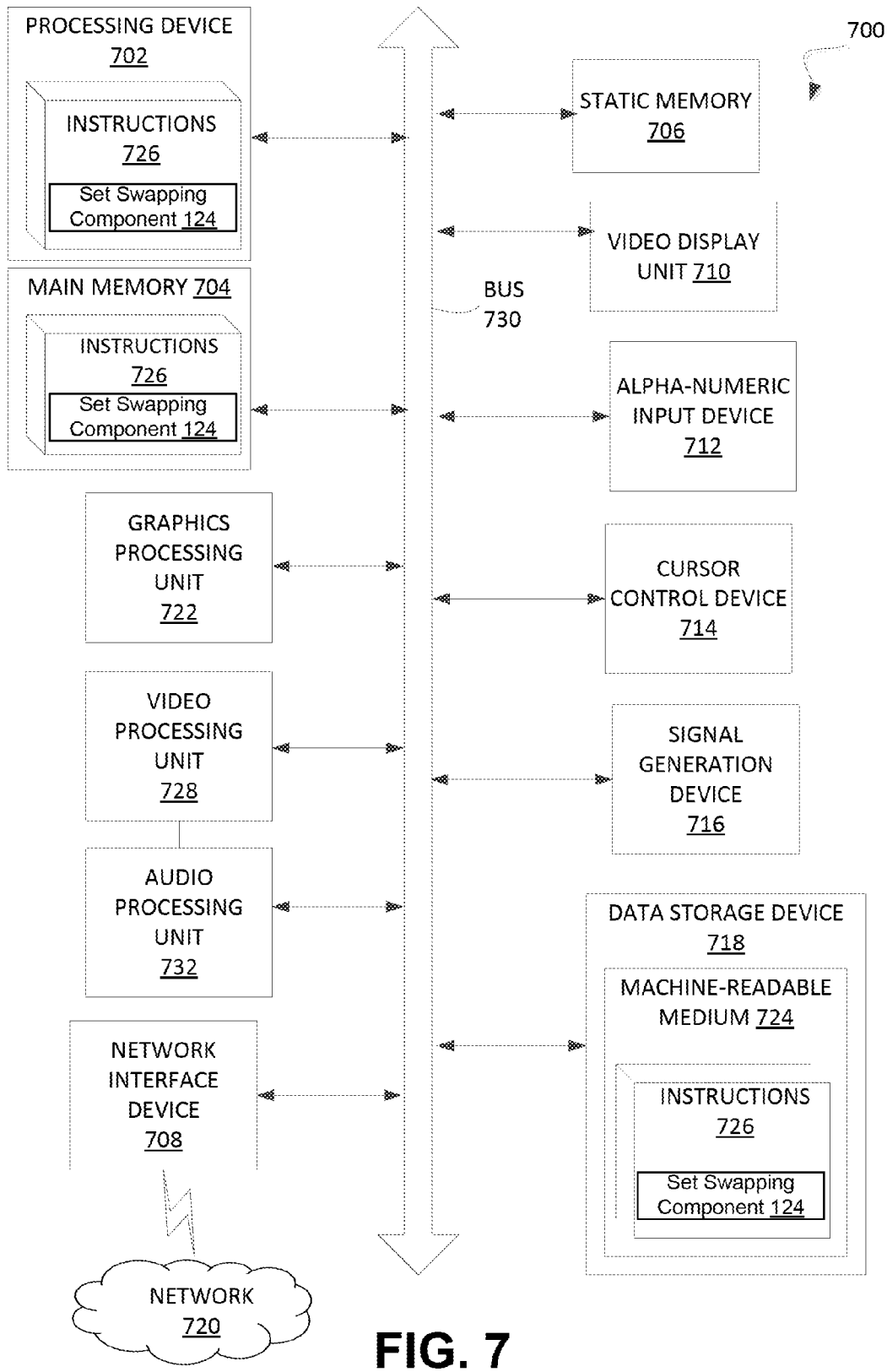
FIG. 7 is a block diagram of another example computer system associated with the solid-state drive.

FIG. 7 is a block diagram of an example machine of a computer system 700 that is associated with a solid-state drive. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), etc.) a static memory 706 (e.g., flash memory, static random access memory (SRAM), etc.), and a data storage device 718, which communicate with each other via a bus 730. The data storage device 718 may correspond to the solid-state drive 120 of FIG. 1. In some embodiments, any or all of the main memory 704, static memory 706, and data storage device 718 may be implemented as part of the solid-state drive 120.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to a set swapping component (e.g., set swapping component 124 of FIG. 1). While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

The following examples pertain to further embodiments.

Example 1 is a solid-state storage device comprising a non-volatile memory and a controller, coupled to the non-volatile memory, to identify a first set of a first plurality of physical block addresses of the non-volatile memory and identify a second set of a second plurality of physical block addresses of the non-volatile memory with a last physical block address of the first set being adjacent to a first physical block address of the second set. The controller may further, in response to a request to perform a wear leveling operation for the non-volatile memory, swap first data from a first physical block address of the first set with second data from the first physical block address of the second set, identify a second physical block address of the first set with the second physical block address of the first set being adjacent to the first physical block address of the first set, and swap third data from the second physical block address of the first set with fourth data from a second physical block address of the second set with the second physical block address of the second set being adjacent to the first physical block address of the second set.

In Example 2, in apparatus of Example 1, the first plurality of physical block addresses and the second plurality of physical block addresses of the non-volatile memory are contiguous before the swapping of the first data from the first physical block address.

In Example 3, in the apparatus of any of Examples 1-2, the first set is associated with a first number of write operations and the second set is associated with a second number of write operations, wherein the first number of write operations exceeds the second number of write operations, and wherein the first set corresponds to a memory region and the second set corresponds to a storage region.

In Example 4, in the apparatus of any of Examples 1-3, the controller is further to in response to the swap of the first data with the second data, update transform data associated with mapping a first logical address from the first physical block address of the first set to the first physical block address of the second set and in response to the swap of the third data with the fourth data, update the transform data associated with mapping a second logical address from the second physical block address of the first set to the second physical block address of the second set.

In Example 5, in the apparatus of any of Examples 1-4, the controller is further to repeat for each subsequent physical block address of the first set after the second physical block address of the first set until data from each physical block address of the first set has been swapped with data from subsequent physical block addresses of the second set: increment a prior physical block address of the first set associated with data that was previously swapped with data of a prior physical block address of the second set to identify an incremented physical block address of the first set and swap data from the incremented physical block address of the first set with data from a subsequent physical block address of the second set, the subsequent physical block address being adjacent to the prior physical block address of the second set.

In Example 6, in the apparatus of any of Examples 1-5, the swapping of the first data from the first physical block address is at a first time and the swapping of the third data from the second physical block address is at a second time after the first time.

In Example 7, in the apparatus of any of Examples 1-6, the controller is further to receive a read operation corresponding to a logical address, determine a particular physical block address corresponding to the logical address based on a transform in view of a start logical address of a span that includes the logical address and an offset for the span that includes the logical address, and retrieve particular data stored at the particular physical block address in response to the read operation.

In Example 8, in the apparatus of any of Examples 1-7, the transform is implemented based on a comparator and a plurality of registers, wherein the plurality of registers identify the start logical address and the offset that identifies a corresponding physical block address to which the start logical address is mapped to.

In Example 9, in the apparatus of any of Examples 1-8, the first set of the first plurality of physical block addresses corresponds to block addresses of a first memory device of the non-volatile memory and the second set of the second plurality of physical block addresses corresponds to block addresses of a second memory device of the non-volatile memory.

In Example 10, in the apparatus of any of Examples 1-9, the non-volatile memory is a two-level memory.

In Example 11, in the apparatus of any of Examples 1-10, a rate of the swapping is based on a rate of receiving write operations associated with the non-volatile memory.

Example 12 is a method comprising identifying a first set of a first plurality of physical block addresses of a non-volatile memory, identifying a second set of a second plurality of physical block addresses of the non-volatile memory, a last physical block address of the first set being adjacent to a first physical block address of the second set, in response to a request to perform a wear leveling operation for the non-volatile memory, swapping, by a processing device, first data from a first physical block address of the first set with second data from the first physical block address of the second set, identifying a second physical block address, the second physical block address of the first set being adjacent to the first physical block address of the first set, and swapping third data from the second physical block address of the first set with fourth data from a second physical block address of the second set, the second physical block address of the second set being adjacent to the first physical block address of the second set.

In Example 13, in the method of Example 12, the first plurality of physical block addresses and the second plurality of physical block addresses of the non-volatile memory are contiguous before the swapping of the first data from the first physical block address.

In Example 14, in the method of any of Examples 12-13, the first set is associated with a first number of write operations and the second set is associated with a second number of write operations, the first number of write operations exceeds the second number of write operations, and wherein the first set corresponds to a memory region and the second set corresponds to a storage region.

In Example 15, in the method of any of Examples 12-14, the method further comprises in response to the swap of the first data with the second data, updating transform data associated with mapping a first logical address from the first physical block address of the first set to the first physical block address of the second set, and in response to the swap of the third data with the fourth data, updating the transform data associated with mapping a second logical address from the second physical block address of the first set to the second physical block address of the second set.

In Example 16, in the method of any of Examples 12-15, the method further comprises repeating for each subsequent physical block address of the first set after the second physical block address of the first set until data from each physical block address of the first set has been swapped with data from subsequent physical block addresses of the second set: incrementing a prior physical block address of the first set associated with data that was previously swapped with data of a prior physical block address of the second set to identify an incremented physical block address of the first set, and swapping data from the incremented physical block address of the first set with data from a subsequent physical block address of the second set, the subsequent physical block address being adjacent to the prior physical block address of the second set.

In Example 17, in the method of any of Examples 12-16, the swapping of the first data from the first physical block address is at a first time and the swapping of the third data from the second physical block address is at a second time after the first time.

In Example 18, in the method of any of Examples 12-17, the method further comprises receiving a read operation corresponding to a logical address, determining a particular physical block address corresponding to the logical address based on a transform in view of a start logical address of a span that includes the logical address and an offset for the span that includes the logical address, and retrieving particular data stored at the particular physical block address in response to the read operation.

In Example 19, in the method of any of Examples 12-18, the transform is implemented based on a comparator and a plurality of registers and the plurality of registers identify the start logical address and the offset that identifies a corresponding physical block address to which the start logical address is mapped to.

Example 20 is an integrated circuit that comprises a solid-state drive (SSD) controller, coupled with a plurality of non-volatile memory devices associated with an address space of an SSD, to identify a first set of a first plurality of locations of the address space of the SSD and a second set of a second plurality of locations of the address space of the SSD with a last location of the first set being adjacent to a first location of the second set, receive a request to perform a wear leveling operation for the SSD, in response to the request, swap first data from a first location of the first set with second data from the first location of the second set, identify a second location of the first set with the second location of the first set being adjacent to the first location of the first set and swap third data from the second location of the first set with fourth data from a second location of the second set with the second location of the second set being adjacent to the first location of the second set.

In Example 21, in the integrated circuit of Example 20, the first plurality of locations of the address space and the second plurality of locations of the address space are contiguous before the swapping of the first data from the first location.

In Example 22, in the integrated circuit of any of Examples 19-20, the first set is associated with a first number of write operations and the second set is associated with a second number of write operations, the first number of write operations exceeds the second number of write operations, and wherein the first set corresponds to a memory region and the second set corresponds to a storage region.

In Example 23, in the integrated circuit of any of Examples 20-22, the SSD controller is further to, in response to the swap of the first data from the first location with the second data, update transform data associated with mapping a first logical address from the first location of the first set to the first location of the second set and, in response to the swap of the third data from the second location with the fourth data, update the transform data associated with mapping a second logical address from the second location of the first set to the second location of the second set.

In Example 24, in the integrated circuit of any of Examples 20-23, the SSD controller is further to repeat for each subsequent location of the first set after the second location of the first set until data from each location of the first set has been swapped with data from subsequent locations of the second set: increment a prior location of the first set associated with data that was previously swapped with data of a prior location of the second set to identify an incremented location of the first set and swap data from the incremented location of the first set with data from a subsequent location of the second set, the subsequent location being adjacent to the prior location of the second set.

In Example 25, in the integrated circuit of any of Examples 20-24, the swapping of the first data from the first location is at a first time and the swapping of the third data from the second location is at a second time after the first time.

In Example 26, in the integrated circuit of any of Examples 20-25, the SSD controller is further to receive a read operation corresponding to a logical address, determine a particular physical block address corresponding to the logical address based on a transform in view of a start logical address of a span that includes the logical address and an offset for the span that includes the logical address, and retrieve particular data stored at the particular location in response to the read operation.

In Example 27, in the integrated circuit of any of Examples 20-26, the transform is implemented based on a comparator and a plurality of registers, wherein the plurality of registers identify the start logical address and the offset that identifies a corresponding physical block address to which the start logical address is mapped to.

Example 28 is a system on a chip (SOC) comprising a plurality of functional units and a controller, coupled to the functional units, to identify a first set of a first plurality of physical block addresses of a non-volatile memory, identify a second set of a second plurality of physical block addresses of the non-volatile memory with a last physical block address of the first set being adjacent to a first physical block address of the second set, in response to a request to perform a wear leveling operation for the non-volatile memory, swap first data from a first physical block address of the first set with second data from the first physical block address of the second set, identify a second physical block address of the first set with the second physical block address of the first set being adjacent to the first physical block address of the first set, and swap third data from the second physical block address of the first set with fourth data from a second physical block address of the second set with the second physical block address of the second set being adjacent to the first physical block address of the second set.

In Example 29, the SOC of Example 28 further comprises the subject matter of any of Examples 2-11.

In Example 30, the SOC of any of Examples 28-29 further comprises the subject matter of any of Examples 12-19.

In Example 31, the SOC of any of Examples 28-30 further comprises the subject matter of any of Examples 20-27.

Example 32 is an apparatus comprising means for identifying a first set of a first plurality of physical block addresses of a non-volatile memory, means for identifying a second set of a second plurality of physical block addresses of the non-volatile memory with a last physical block address of the first set being adjacent to a first physical block address of the second set, means for swapping, by a processing device and in response to a request to perform a wear leveling operation for the non-volatile memory, first data from a first physical block address of the first set with second data from the first physical block address of the second set, means for identifying a second physical block address with the second physical block address of the first set being adjacent to the first physical block address of the first set, and means for swapping third data from the second physical block address of the first set with fourth data from a second physical block address of the second set with the second physical block address of the second set being adjacent to the first physical block address of the second set.

In Example 33, the SOC of Example 32 further comprises the subject matter of any of Examples 1-17.

Example 34 is an apparatus comprising a memory and a processor coupled to the memory and comprising a controller where the controller is configured to perform the method of any of Examples 12-19.

In Example 35, the apparatus of Example 33 further comprises the subject matter of any of Examples 1-11 and 20-27.

Example 36 is a non-transitory machine-readable storage medium including instructions that, when accessed by a processing device, cause the processing device to perform operations comprising identifying a first set of a first plurality of physical block addresses of a non-volatile memory, identifying a second set of a second plurality of physical block addresses of the non-volatile memory with a last physical block address of the first set being adjacent to a first physical block address of the second set, in response to a request to perform a wear leveling operation for the non-volatile memory, swapping first data from a first physical block address of the first set with second data from the first physical block address of the second set, identifying a second physical block address with the second physical block address of the first set being adjacent to the first physical block address of the first set, and swapping third data from the second physical block address of the first set with fourth data from a second physical block address of the second set with the second physical block address of the second set being adjacent to the first physical block address of the second set.

In Example 37, in the non-transitory machine-readable storage medium of Example 36, the operations further comprise the subject matter of any of Examples 13-19.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

What is claimed is:

1. An apparatus comprising:
   a non-volatile memory; and
   a controller, coupled to the non-volatile memory, to:
   identify a first set of a first plurality of physical block addresses of the non-volatile memory, wherein each of the first plurality of physical block addresses is mapped to a logical address of a first set of a first plurality of logical addresses;
   identify a second set of a second plurality of physical block addresses of the non-volatile memory, a last physical block address of the first set being adjacent to a first physical block address of the second set, wherein each of the second plurality of physical block addresses is mapped to a logical address of a second set of a second plurality of logical addresses, and wherein the first set of the first plurality of logical addresses and the second set of the second plurality of logical address are logically contiguous;
   in response to a request to perform a wear leveling operation for the non-volatile memory, swap first data from a first physical block address of the first set with second data from the first physical block address of the second set of the second plurality of physical block addresses;
   identify a second physical block address of the first set, the second physical block address of the first set being adjacent to the first physical block address of the first set; and
   swap third data from the second physical block address of the first set with fourth data from a second physical block address of the second set, the second physical block address of the second set being adjacent to the first physical block address of the second set; and
   determine a particular physical block address from any one of the logical addresses based a transform comprising:
      a first span stored as a first start logical address in a first register and a first offset in a second register, the first start logical address and the first offset identifying a corresponding physical block address to which the first start logical address is mapped;
      a second span stored as a second start logical address in a third register and a second offset in a fourth register, the second start logical address and the second offset identifying a corresponding physical block address to which the second start logical address is mapped;
      a third span stored as a third start logical address in a fifth register and a third offset in a sixth register, the third start logical address and the third offset identifying a corresponding physical block address to which the third start logical address is mapped;
      a fourth span stored as a fourth start logical address in a seventh register and a fourth offset in an eighth register, the fourth start logical address and the fourth offset identifying a corresponding physical block address to which the fourth start logical address is mapped; and
      a size value stored in a ninth register, the size value is a number of the first plurality of physical block addresses and the second plurality of physical block addresses.

2. The apparatus of claim 1, wherein the first plurality of physical block addresses and the second plurality of physical block addresses of the non-volatile memory are contiguous before the swapping of the first data from the first physical block address.

3. The apparatus of claim 1, wherein the first set is associated with a first number of write operations and the second set is associated with a second number of write operations, wherein the first number of write operations exceeds the second number of write operations, and wherein the first set corresponds to a memory region and the second set corresponds to a storage region.

4. The apparatus of claim 1, wherein the controller is further to:
   in response to the swap of the first data with the second data, update transform data associated with mapping a first logical address from the first physical block address of the first set to the first physical block address of the second set; and
   in response to the swap of the third data with the fourth data, update the transform data associated with mapping a second logical address from the second physical block address of the first set to the second physical block address of the second set.

5. The apparatus of claim 1, wherein the controller is further to:
repeat for each subsequent physical block address of the first set after the second physical block address of the first set until data from each physical block address of the first set has been swapped with data from subsequent physical block addresses of the second set:
increment a prior physical block address of the first set associated with data that was previously swapped with data of a prior physical block address of the second set to identify an incremented physical block address of the first set; and
swap data from the incremented physical block address of the first set with data from a subsequent physical block address of the second set, the subsequent physical block address being adjacent to the prior physical block address of the second set.

6. The apparatus of claim 1, wherein the swapping of the first data from the first physical block address is at a first time and the swapping of the third data from the second physical block address is at a second time after the first time.

7. The apparatus of claim 1, wherein the controller is further to:
receive a read operation corresponding to a logical address;
determine a particular physical block address corresponding to the logical address based on the transform in view of a start logical address of a span that includes the logical address and an offset for the span that includes the logical address; and
retrieve particular data stored at the particular physical block address in response to the read operation.

8. The apparatus of claim 7, wherein the transform is implemented based on a comparator and the first register, the second register, the third register, the fourth register, the fifth register, the sixth register, the seventh register, the eighth register, and the ninth register.

9. The apparatus of claim 1, wherein the first set of the first plurality of physical block addresses corresponds to block addresses of a first non-volatile device of the non-volatile memory and the second set of the second plurality of physical block addresses corresponds to block addresses of a second non-volatile device of the non-volatile memory.

10. The apparatus of claim 1, wherein the non-volatile memory is a two-level memory that comprises a storage region and a memory region.

11. The apparatus of claim 1, wherein a rate of the swapping is based on a rate of receiving write operations associated with the non-volatile memory.

12. A method comprising
identifying a first set of a first plurality of physical block addresses of a non-volatile memory, wherein each of the first plurality of physical block addresses is mapped to a logical address of a first set of a first plurality of logical addresses using a first span and a second span of a transform, the first span being stored as a first start logical address and a first offset and the second span being stored as a second start logical address and a second offset;
identifying a second set of a second plurality of physical block addresses of the non-volatile memory, a last physical block address of the first set being adjacent to a first physical block address of the second set, wherein each of the second plurality of physical block addresses is mapped to a logical address of a second set of a second plurality of logical addresses using a third span and a fourth span of the transform, the third span being stored as a third start logical address and a third offset and the second span being stored as a fourth start logical address and a fourth offset, and wherein the first set of the first plurality of logical addresses and the second set of the second plurality of logical address are logically contiguous;
in response to a request to perform a wear leveling operation for the non-volatile memory, swapping, by a processing device, first data from a first physical block address of the first set with second data from the first physical block address of the second set and updating the first span, the second span, the third span, and the fourth span in view of the swapping the first data with the second data;
identifying a second physical block address, the second physical block address of the first set being adjacent to the first physical block address of the first set; and
swapping third data from the second physical block address of the first set with fourth data from a second physical block address of the second set, the second physical block address of the second set being adjacent to the first physical block address of the second set; and
updating the first span, the second span, the third span, and the fourth span in view of the swapping the third data with the fourth data.

13. The method of claim 12, wherein the first plurality of physical block addresses and the second plurality of physical block addresses of the non-volatile memory are contiguous before the swapping of the first data from the first physical block address.

14. The method of claim 12, wherein the first set is associated with a first number of write operations and the second set is associated with a second number of write operations, wherein the first number of write operations exceeds the second number of write operations, and wherein the first set corresponds to a memory region and the second set corresponds to a storage region.

15. The method of claim 12, further comprising:
in response to the swap of the first data with the second data, updating transform data associated with mapping a first logical address from the first physical block address of the first set to the first physical block address of the second set; and
in response to the swap of the third data with the fourth data, updating the transform data associated with mapping a second logical address from the second physical block address of the first set to the second physical block address of the second set.

16. The method of claim 12, further comprising:
repeating for each subsequent physical block address of the first set after the second physical block address of the first set until data from each physical block address of the first set has been swapped with data from subsequent physical block addresses of the second set:
incrementing a prior physical block address of the first set associated with data that was previously swapped with data of a prior physical block address of the second set to identify an incremented physical block address of the first set; and
swapping data from the incremented physical block address of the first set with data from a subsequent physical block address of the second set, the subsequent physical block address being adjacent to the prior physical block address of the second set.

17. The method of claim 12, wherein the swapping of the first data from the first physical block address is at a first time and the swapping of the third data from the second physical block address is at a second time after the first time.

18. The method of claim 12, further comprising:
receiving a read operation corresponding to a logical address;
determining a particular physical block address corresponding to the logical address based on the transform in view of a start logical address of a span that includes the logical address and an offset for the span that includes the logical address; and
retrieving particular data stored at the particular physical block address in response to the read operation.

19. The method of claim 18, wherein the transform is implemented based on a comparator and a plurality of registers, wherein each of the plurality of registers identify a corresponding start logical address and a corresponding offset that identifies a corresponding physical block address to which the corresponding start logical address is mapped.

20. An integrated circuit comprising:
a solid-state drive (SSD) controller, coupled with a plurality of non-volatile memory devices associated with an address space of an SSD, to:
identify a first set of a first plurality of locations of the address space of the SSD and a second set of a second plurality of locations of the address space of the SSD, a last location of the first set being adjacent to a first location of the second set, wherein each of the first set is mapped to a logical address of a first set of logical addresses using a first span and a second span of a transform, the first span being stored as a first start logical address and a first offset and the second span being stored as a second start logical address and a second offset, wherein each of the second set is mapped to a logical address of a second set of logical addresses using a third span and a fourth span of the transform, the third span being stored as a third start logical address and a third offset and the second span being stored as a fourth start logical address and a fourth offset, wherein the first set of logical addresses and the second set of logical addresses are logically contiguous;
receive a request to perform a wear leveling operation for the SSD;
in response to the request, swap first data from a first location of the first set with second data from the first location of the second set and updating the first span, the second span, the third span, and the fourth span in view of the first data being swapped with the second data;
identify a second location of the first set, the second location of the first set being adjacent to the first location of the first set;
swap third data from the second location of the first set with fourth data from a second location of the second set, the second location of the second set being adjacent to the first location of the second set; and
update the first span, the second span, the third span, and the fourth span in view of the third data being swapped with the fourth data.

21. The integrated circuit of claim 20, wherein the first plurality of locations of the address space and the second plurality of locations of the address space are contiguous before the swapping of the first data from the first location.

22. The integrated circuit of claim 20, wherein the first set is associated with a first number of write operations and the second set is associated with a second number of write operations, wherein the first number of write operations exceeds the second number of write operations, and wherein the first set corresponds to a memory region and the second set corresponds to a storage region.

23. The integrated circuit of claim 20, wherein the SSD controller is further to:
in response to the swap of the first data from the first location with the second data, update transform data associated with mapping a first logical address from the first location of the first set to the first location of the second set; and
in response to the swap of the third data from the second location with the fourth data, update the transform data associated with mapping a second logical address from the second location of the first set to the second location of the second set.

24. The integrated circuit of claim 20, wherein the SSD controller is further to:
repeat for each subsequent location of the first set after the second location of the first set until data from each location of the first set has been swapped with data from subsequent locations of the second set:
increment a prior location of the first set associated with data that was previously swapped with data of a prior location of the second set to identify an incremented location of the first set; and
swap data from the incremented location of the first set with data from a subsequent location of the second set, the subsequent location being adjacent to the prior location of the second set.

25. The integrated circuit of claim 20, wherein the swapping of the first data from the first location is at a first time and the swapping of the third data from the second location is at a second time after the first time.

26. The integrated circuit of claim 20, wherein the SSD controller is further to:
receive a read operation corresponding to a logical address;
determine a particular physical block address corresponding to the logical address based on the transform in view of a corresponding start logical address of a respective one of the first span, the second span, the third span, and the fourth span the first that includes within its corresponding offset the logical address; and
retrieve particular data stored at the particular physical block address in response to the read operation.

27. The integrated circuit of claim 26, wherein the transform is implemented based on a comparator and a plurality of registers, wherein each of the plurality of registers identify a corresponding start logical address and a corresponding offset that identifies a corresponding physical block address to which the corresponding start logical address is mapped.

* * * * *